June 10, 1952 W. L. GEORGE 2,599,909
CHECK STAND FOR GROCERY STORES AND THE LIKE
Filed Sept. 15, 1947 2 SHEETS—SHEET 1

INVENTOR.
William L. George
BY
Attorney.

June 10, 1952 W. L. GEORGE 2,599,909
CHECK STAND FOR GROCERY STORES AND THE LIKE
Filed Sept. 15, 1947 2 SHEETS—SHEET 2

INVENTOR.
William L. George
BY
Otto A. Earl
Attorney.

Patented June 10, 1952

2,599,909

UNITED STATES PATENT OFFICE 2,599,909

CHECK STAND FOR GROCERY STORES AND THE LIKE

William L. George, Grand Rapids, Mich., assignor to Will L. George Corporation, Grand Rapids, Mich., a corporation of Michigan Application September 15, 1947, Serial No. 774,020

7 Claims. (Cl. 186—1)

1

This invention relates to improvements in check stand for grocery stores and the like.

The principal objects of this invention are:

First, to provide a stand for checking out the items of a customer's purchase in a grocery store or the like which will speed up the operation of checking each item and reduce the possibility of error in missing items or checking a single item twice.

Second, to provide a checking stand for grocery stores and the like which will relieve the operator of the stand of unnecessary motions in arranging and disposing of the items checked.

Third, to provide a checking stand arranged to support a cash register or other recording machine in a position where the operator may view both the register and the items to be checked without turning her head or body.

Fourth, to provide a checking stand for grocery stores and the like which eliminates the tendency of customers to move items of a purchase, either ill advisedly or maliciously, and thus confuse the operator in the process of checking the items.

Fifth, to provide a checking stand which will successively place the several items of a large purchase in a convenient position where they may be viewed, recorded and transferred by the checker.

Sixth, to provide a checking stand for groceries and the like in which the operator's motions in moving the articles to be checked conform to the natural swinging motion of the operator's arm as distinguished from a straight line movement which requires the operator's visual attention.

Other objects and advantages pertaining to the details of my invention will be apparent from a consideration of the following description and claims.

The drawings, of which there are two sheets, illustrated a preferred form of my check stand and one modified form thereof.

Figure 1:
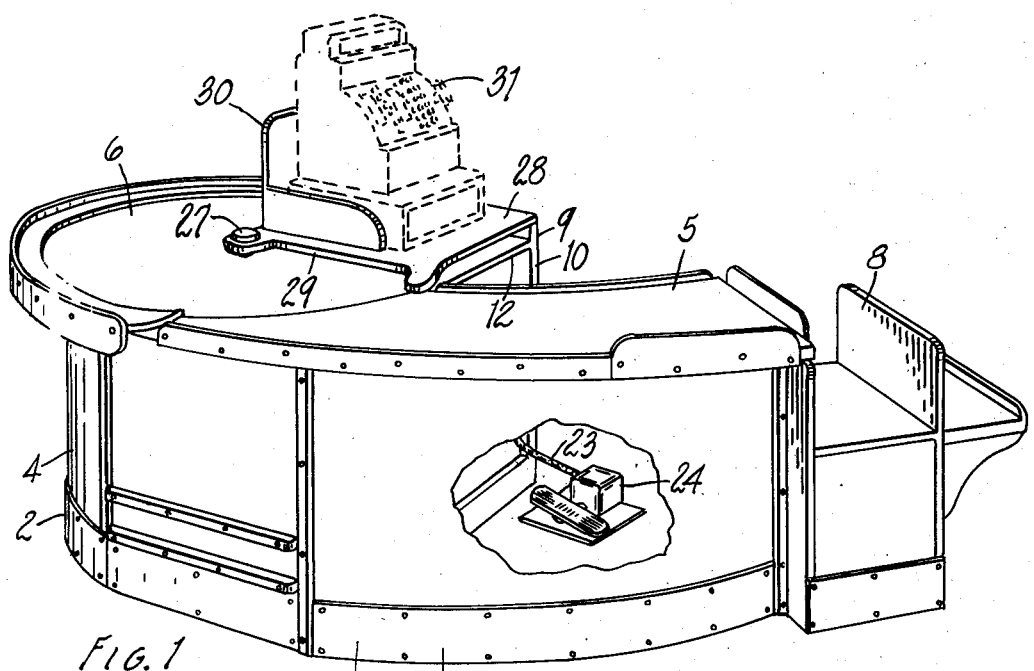
Fig. 1 is a perspective view of my check stand as viewed from the customer's side of the stand and partially broken away to illustrate the control mechanism.

My check stand is designed primarily for use in grocery stores of the self-service type known as Super-Markets where the customer collects the

2 items desired in a basket or cart and places them on a stand to be checked before the customer leaves the store. Checking stands of this type are universally provided with a recording cash register on which the prices of the several items of the customer's purchase are recorded and the total price obtained. In the past these checking stands have taken the form of a straight counter upon which the customer placed her purchases, and a cash register placed behind and parallel to the counter and operated by an employee of the store known as a checker.

In checking out large purchases during rush hours customers tend to move individual items of their purchase on the counter, either in a misguided attempt to aid the checker or purposely to confuse the checker and prevent the charging of one or more items. These older stands also require the checker to turn her eyes and body at least 90 degrees from the cash register to select, identify, and move each item of the purchase toward the end of the checking stand and back to the cash register to record the item.

My present check stand provides a revolving turn-table upon which the customer places the several items of the purchase. The turn-table rotates under the control of the checker and successively places the items of the purchase against a stop extending radially of the turn-table and adjacent to the side of the cash register which is supported over one quadrant of the turn table. The checker, who stands facing the cash register, merely has to glance down and slightly to one side to view each successive item as it is carried against the stop and back to the cash register to record the item. The discharge end of the check stand to which the items of the purchase are moved after being recorded on the cash register is disposed generally tangentially with respect to the turn table and extends preferably along an arc conforming generally to the natural swing of the checker's arm as she stands facing the cash register and the stop portion of the stand. The checker may thus grasp each item as it reaches the stop and swing her arm in a natural swinging motion to the rear to dispose of each item as it is checked. A shelf or stand is provided at the extreme end of the discharge portion of the stand for use in sacking the items of the purchase.

I have found that a stand of this character accelerates the speed with which a checker may tabulate and move the items of a large purchase, principally because each item is brought into a convenient position for recording and because the checker need not turn around to see the position in which she places the items after checking them. I have also found that the tendency of the purchasing public to attempt to move items once they have been placed on the check stand is entirely eliminated, thus a great deal of inaccuracy and loss to the store is eliminated.

Figure 2:
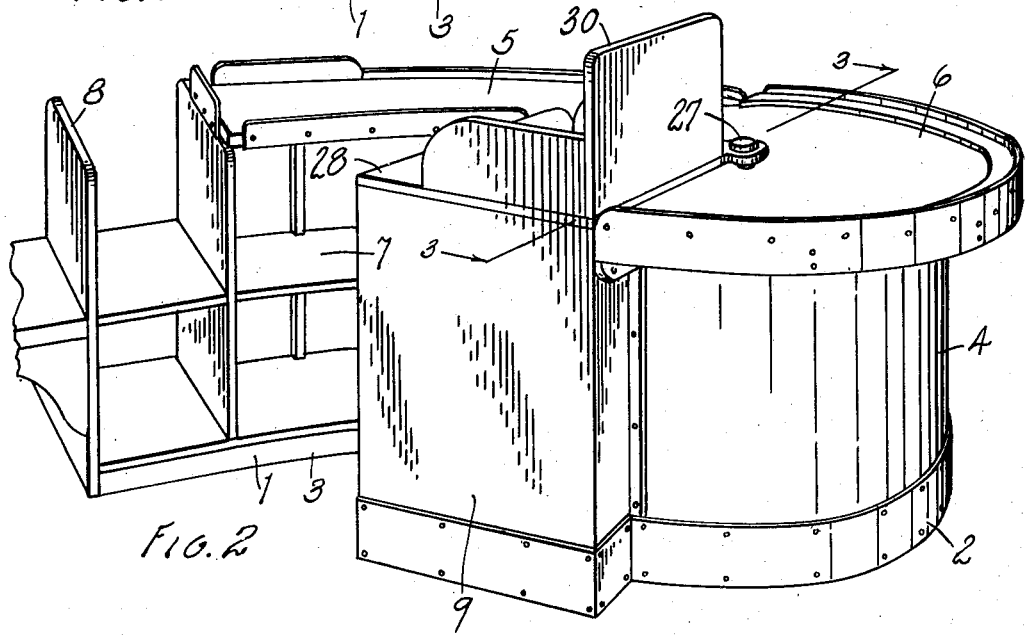
Fig. 2 is a perspective view of my check stand from the operator's side of the stand.
Figure 3:
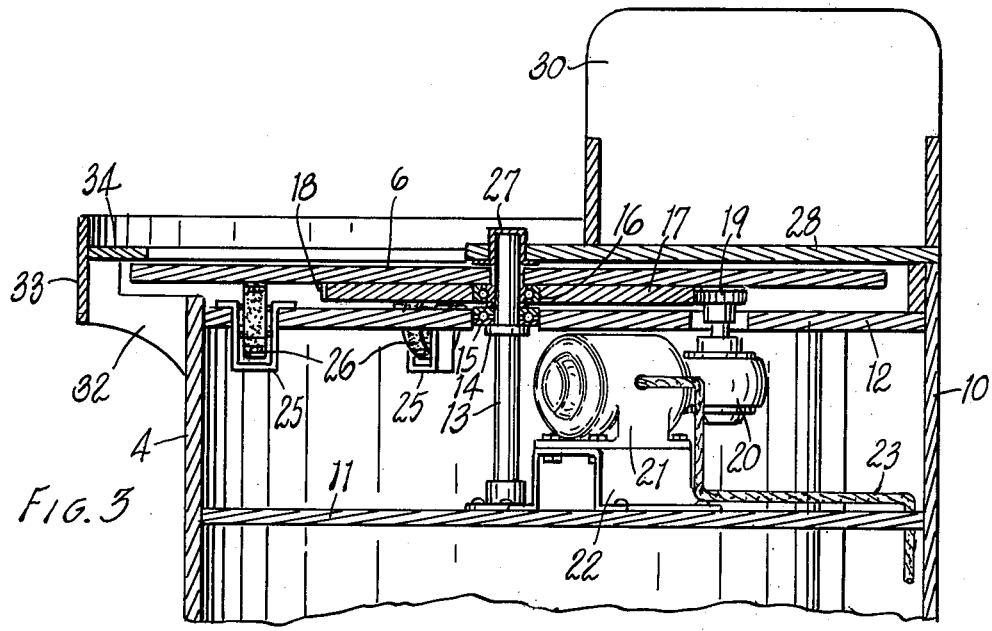
Fig. 3 is a transverse cross sectional view of my check stand along the line 3—3 in Fig. 2 and illustrates the moving parts thereof.

Referring to the examples of my check stand illustrated in the drawings, attention is first invited to Figs. 1 to 3. My preferred stand consists of a base 1 having a semi-circular front portion 2 merging with an arcuate rear portion 3 which extends generally tangentially from the outer side of the semi-circular portion 2. Suitable side panels 4 extend upwardly from the base to form supports for the discharge counter 5 and turn-table 6. Suitable rails are preferably provided on the edges of the discharge counter as shown in Figs. 1 and 2. Shelving may be provided as at 7 in Fig. 2 for storing paper bags underneath the discharge counter, and a sacking stand is provided at 8 at the end of the discharge counter. A register stand 9 is provided against the inner side of the semi-circular base 2 and occupies the quadrant of the turn-table between the discharge counter 5 and the semi-circular base 2.

The structure for mounting the turn-table 6 is more particularly illustrated in Fig. 3, which shows the outer panel 4 of the check stand and the inner panel 10 of the register stand as forming supports for a lower shelf 11. An upper shelf 12 is supported by the panels 4 and 10 near the upper edge of the panels. A center post 13 is fixedly secured to the lower shelf 11 and extends upwardly through an aperture in the upper shelf 12. The post 13 is provided with a collar 14 upon which rests a thrust bearing 15. The thrust bearing 15 in turn supports a radial bearing 16 mounted in the center of a sub-table member 17.

The sub-table member 17 is secured to and supports the turn-table 6 and is provided with gear teeth 18 around the periphery thereof. The teeth 18 mesh with the teeth on a driving pinion 19 driven through a gear box 20 from the electric motor 21. The motor is supported on the lower shelf 12 by a bracket 22 and is controlled through a power cable 23 from a foot pedal switch 24 (see Fig. 1) controlled by the stand operator.

The upper shelf 12 defines a plurality of apertures in which are supported the U-shaped brackets 25 for rotatably supporting a series of rolls 26 angularly disposed around the under side of the turn-table 6 and serving to freely support the turn-table as it rotates. Suitable self-centering mounts (not illustrated) for the rolls 26 are provided on the brackets 25 so that the rolls will aline themselves to have free rolling contact with the turn-table 6.

The post 13 extends upwardly through the sub-table 17 and turn-table 6 and is provided on its upper end with an inverted outwardly flanged cup member 27. The flange on the cup member 27 is arranged to support the forward corner of a register support panel 28. The outer edge of the register panel 28 is suported upon the upper edge of the register stand panel 10 and the rear corner of the register panel is supported on the front edge of the discharge counter 5 so that the turn-table 6 may rotate freely underneath the cash register support panel. The inner side edge of the cash register panel is recessed as at 29 to lie generally along a radius of the turn-table 6 to receive and stop the items of a purchase as the turn-table rotates in a counter-clockwise direction.

The cash register support panel 28 is provided with retaining walls 30 as desired for retaining a cash register 31 thereon. The side walls 4 on the check stand are provided with brackets 32 (see Fig. 3) which support a vertical rail 33 around the side of the turn-table 6. A guard ring 34 is carried by the rail 33 and overlies the outer edge of the turntable to prevent the customer's hand or items of purchase becoming wedged between the turn-table and the rail. The guard ring projects at one end partially over the discharge counter where the counter adjoins the outer side of the turntable.

Figure 4:
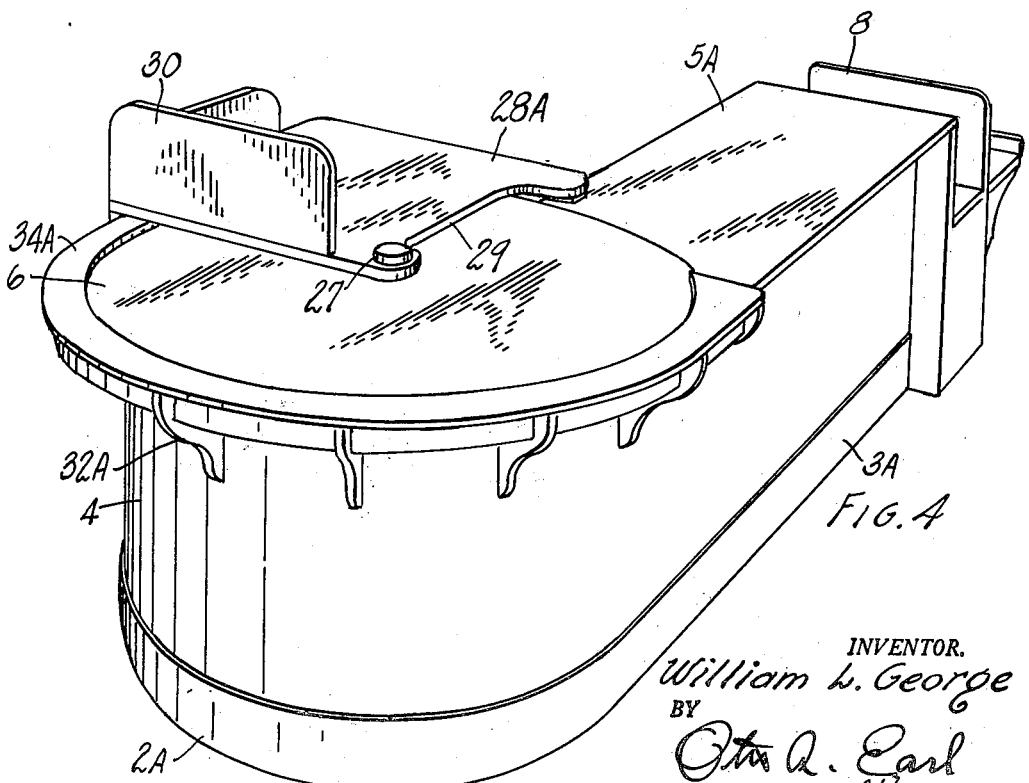
Fig. 4 is a perspective view of a modified form of my check stand.

In the modified form of checking stand illustrated in Fig. 4, the base 2A is semi-circular as in the preferred form of stand, but the discharge end 3A of the base extends in a straight line from the semi-circular base 2A. The side panels 4 conform to the shape of the base 2A and 3A and support a straight discharge panel 5A and the turn-table 6 in the same manner as the preferred form of my check stand. The cash register support panel 28A is similar to the support panel 28 in the preferred form of the invention and is supported by the same type of inverted cup 27 in that form of the invention. The ring 34A is supported upon brackets 32A and serves the same purpose as the guard ring 34 in the preferred form of the invention.

It should be readily apparent that the particular details of construction of the base, counter and cash register stand are relatively immaterial, so long as the turn table 6 will rotate to move the items of a purchase against the stop 29. Similarly, the particular construction of the motor 21 and driving gears 18, 19 and 20 is immaterial, since the turn-table may be moved continually, intermittently, or manually as desired, depending upon the amount of business to be handled.

The important features of my check stand are the turn-table which brings each item of a purchase into convenient position alongside of the cash register for checking and the curved shape of the discharge counter which permits the checker to move each item to the rear with a natural swinging motion of her arm and without turning to see where the item is placed. The two features are mutually cooperative and I prefer to combine the two, but either may be used alone with highly desirable results.

I have thus described two highly practical commercial embodiments of my checking stand so that others may reproduce the same without further description.

Having thus described my invention what I claim as new and desire to secure by Letters Patent is:

1. A checking stand for grocery stores and the like comprising a front portion having upper and lower shelves, a vertical post secured to said lower shelf and extending upwardly through said upper shelf, a shoulder on said post, a thrust bearing positioned against said shoulder, a turn-table having a center bearing rotatably mounted on said post and against said thrust bearing, said post extending upwardly through said turn-table, rollers supported on said upper shelf and angularly disposed around said turntable to support the outer portion of said turntable, gear teeth on the under side of said turntable, a motor supported on said lower shelf and having gears and a driving pinion engaged with said teeth to rotate said turntable, brackets secured around the upper edge of said front portion and supporting a rail around approximately one-half of said turntable, a register support stand connected to said front portion and positioned partially under one quadrant of said turntable, a register support panel disposed over said one quadrant of said turntable and supported at one corner upon the top of said post, one edge of said panel extending generally radially of said turntable to said register support stand for support thereby, a second edge of said panel adjacent said first edge extending radially from said post across said turntable to form a stop over said turntable, a discharge counter having its outer edge extending generally tangentially from the periphery of said turntable and with its leading end extending between said stop and said rail, the top of said discharge counter forming a support for the corner of said support panel at the outer end of the stop thereon, and a switch for regulating said motor located behind said discharge counter.

2. A checking stand for grocery stores and the like comprising a front portion having a shelf, a vertical post secured to said shelf and extending upwardly thereabove, a turntable having a bearing rotatably mounted on said post, rollers supported on said front portion and angularly disposed around said turntable to support the outer portion of said turntable, a motor supported on said front portion and arranged to rotate said turntable, brackets secured around the upper edge of said front portion and supporting a rail around a portion of said turntable, a register support panel disposed over another portion of said turntable and supported at one corner on said post, one edge of said panel extending over said turntable from said post to said front portion for support thereby, another edge of said panel extending across said turntable from said post to form a stop, a discharge counter having its outer edge extending generally tangentially from the periphery of said turntable and with its leading end extending between said stop and said rail, said discharge counter forming a support for the corner of said support panel at the outer end of the stop theron, and a switch for regulating said motor located behind said discharge counter.

3. A checking stand for a grocery store and the like comprising a register support panel having a stop portion along one edge thereof, a turntable mounted to rotate partially underneath said panel whereby articles placed on said turntable will be carried thereby against said stop portion, a discharge counter extending from said turntable adjacent to said support panel, the end of said discharge counter extending from said stop portion arcuately away therefrom for a substantial distance along the periphery of said turntable, said discharge counter extending longitudinally from said end with its inner edge concavely arcuate with respect to said support panel, a guard ring around the exposed edge of said turntable and extending inwardly over the outer edge of said discharge counter to direct items on said table toward said stop portion, a motor for rotating said turntable, and means for controlling said motor located behind said discharge counter for operation by the operator of said stand.

4. A checking stand for grocery stores and the like comprising a base having a semi-circular portion and a discharge portion extending arcuately from one quadrant thereof, a turntable rotatably mounted on the semi-circular portion of said base, an arcuate discharge counter supported on said discharge portion and extending in flush relationship from said turntable, a register support panel supported at one corner above the center of said turntable and at an adjacent corner by the edge of said discharge counter whereby said turntable will rotate freely underneath said support panel, the edge of said panel between said corners being recessed to form a stop along said turntable, a motor for rotating said turntable toward said stop, and a switch for regulating said motor located behind said counter.

5. A checking stand for self-service stores comprising a base, a turntable rotatably mounted above part of said base, a discharge counter supported above the remainder of said base and extending as a continuation from a portion of the periphery of said turntable, a register support panel supported above a quadrant of said turntable adjacent to said counter whereby said turntable will rotate freely in closely spaced relation underneath said support panel, a motor for rotating said turntable, and a switch for regulating said motor.

6. An apparatus of the class described comprising a rotatable receiving table, a stationary guard rail for a substantial portion of the rim of said receiving table, a discharge counter disposed in the plane of said receiving table and having a portion thereof conformed to a segment of the table so that articles may be slid from the receiving table to the discharge counter, means forming a stop for articles on the receiving table and a register support disposed above the plane of said receiving table at the side of said stop, and means for rotating said receiving table.

7. A checking stand for self service stores comprising, an item receiving counter of generally circular outline mounted to rotate in the plane of its surface, a register support positioned in closely spaced relation over a sector of said receiving counter and having a side edge extending generally radially of said receiving counter to the periphery thereof to form an article stop for articles rotated thereagainst by said receiving counter, and a discharge counter extending as a generally co-planar extension of said receiving counter from another sector of said receiving counter adjacent said stop.

WILLIAM L. GEORGE.

REFERENCES CITED

The following references are of record in the file of this patent:

UNITED STATES PATENTS

| Number | Name | Date |
| --- | --- | --- |
| 756,298 | Tench | Apr. 5, 1904 |
| 1,090,713 | Hildenbrand | Mar. 17, 1914 |
| 1,664,055 | Wilcox | Mar. 27, 1928 |
| 2,268,897 | Price | Jan. 6, 1942 |
| 2,305,604 | Campbell | Dec. 22, 1942 |
| 2,317,438 | Bradley | Apr. 27, 1943 |